Dec. 10, 1940.     H. C. BOSTWICK     2,224,337
METHOD OF MAKING TIRE MOLDS
Original Filed March 30, 1937
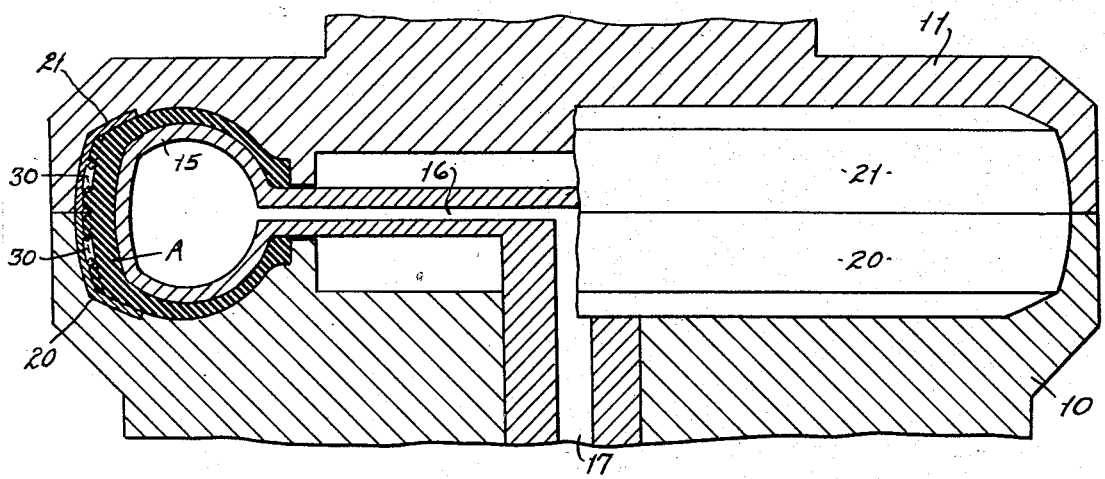
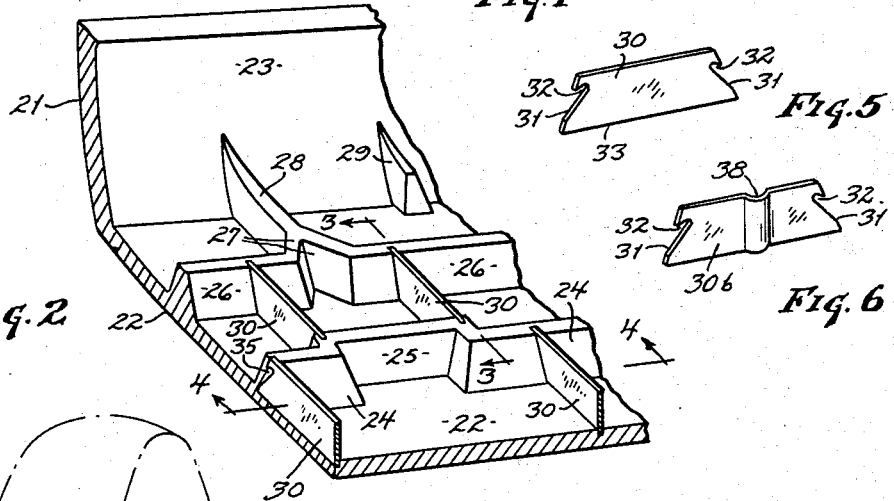
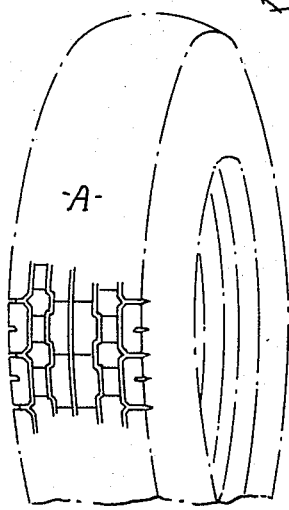
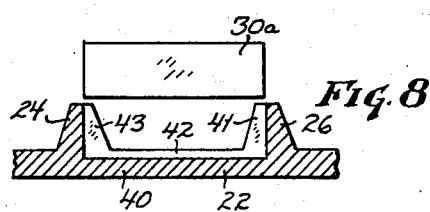
INVENTOR.
Henry C. Bostwick,
BY Bates, Teare & McKee
ATTORNEYS.

Patented Dec. 10, 1940

2,224,337

UNITED STATES PATENT OFFICE 2,224,337

METHOD OF MAKING TIRE MOLDS

Henry C. Bostwick, Akron, Ohio, assignor to Akron Standard Mold Company, a corporation of Ohio Original application March 30, 1937, Serial No. 133,894. Divided and this application November 14, 1939, Serial No. 304,445

1 Claim. (Cl. 29—148.2)

This invention relates to a method of making molds for the manufacture of automotive tires, and the present application comprises a division of my co-pending application, Serial No. 133,894, filed March 30, 1937.

It has been found that tires may be greatly improved as to the prevention or reduction of skidding by forming very narrow transverse grooves or kerfs in the tread. The narrowness of the spaces and the fact that they are bounded by vertical planes is believed to be an important characteristic as the corners of the pads thus produced are less subject to wear in use and thus remain comparatively sharp and obtain a gripping action on the pavement material greater than that which results if the openings between the pads have for instance the usual width and the usual flare toward the periphery. The scientific explanation of the action of such narrow parallel-sided deep transverse kerfs may not have been thoroughly proven but practice has demonstrated that they are effective in materially reducing the skidding.

In forming treads for tires it has been customary to employ ribbed molds, but such molds as heretofore constructed are not adapted for providing the very narrow transverse kerfs desired, and such kerfs have been made by a subsequent sawing operation at considerably increased expense.

An object of the present invention is to provide a method of making molds by means of which the very narrow transverse kerfs may be readily formed without requiring the tire tread to be subjected to a sawing operation, as heretofore described.

I accomplish the foregoing object by utilizing a series of thin steel plates which extend transversely of the peripheral ribs and seat in grooves in such ribs and in the base of the mold. These plates are too thin to be made as an integral casting of the mold metal, but have sufficient stiffness to remain in position and form the desired slots or kerfs in the tire tread. The present application includes as well the method of attaching the plates to the ribs so as to assure a rigid connection therebetween.

In the drawing, Fig. 1 is a cross-section of a vulcanizing mold employing my invention; Fig. 2 is a perspective on a larger scale of a portion of the mold looking at its interior; Figs. 3 and 4 are cross-sections of the mold as indicated by the correspondingly designated lines on Fig. 2; Figs. 5 and 6 are perspective views of the two forms of steel inserts which may be employed in the mold; Fig. 7 is a perspective of a tire produced by the mold shown, the tread formation partially indicated continuing about the tire; Fig. 8 is a section similar to Fig. 3 but illustrating the application of the invention to existing types of molds.

Shown in Fig. 1 is a tire mold composed of two members, designated 10 and 11, the lower of which may if desired be a stationary part of a mold press, the upper being mounted on the lower end of a plunger. Cooperating with the two mold members described is a third hollow annular member 15, for the inside of the tire, the space within this member being supplied with vulcanizing steam through a suitable passageway, indicated at 16 and 17. The annular members with which my invention is concerned are shown as liners 20 and 21 set into correspondingly formed annular cavities in the mold members 10 and 11.

With a tire indicated at A placed on the inner mold member 15 and the mold members 10 and 11 brought together and steam supplied through the passageways, it will be seen that the tire of Fig. 7 is produced having a tread circumference which is the complement of the liner formation.

Referring now particularly to the liner 21 illustrated in Figs. 2 to 6, 22 indicates a comparatively flat but slightly curved annular portion corresponding to the extreme outer periphery of the tire, and 23 an edge flange thereof for the tire portion which lies adjacent the treads. These mold portions carry suitable ribs, preferably somewhat trapezoidal in cross-section to form the comparatively wide grooves extending circumferentially on the tire. In the particular mold shown, there are longitudinal ribs, periodically offset laterally, one of which is indicated at 24 and 25 and another at 26 and 27. Short transverse ribs are indicated at 28 and 29. This formation however will vary materially according to the particular arrangement of grooves desired in the tread.

Coming now to the matter of the inserts, with which the present invention is especially concerned, these may be as indicated in 30, in Figs. 2 to 5 inclusive. Each insert consists of a thin steel plate. Its ends 31 may be inclined toward each other, and in each end may be formed a notch 32 to receive metal of the die casting. If the mold is to be cast about the inserts, then these inserted plates are so positioned in the mold in which the casting is made that when the cast is completed, the lower edge 33 of the insert extends into the annular plate-like portion 22 of the die casting while the end edges extend into the longitudinal ribs. For instance, Fig. 2 shows some of the inserts extending into the longitudinal rib portions 24, and others extending between the rib portion 25 and adjacent longitudinal ribs 26. Besides being attached to the plate-like portion 22 by the adhesion of the inserts to the casting, they are also firmly anchored by reason of the flaring ends entering the ribs and also by means of metal of the ribs occupying the notches 32 of the inserts as illustrated at 35 in Figs. 2 and 3. (The latter figure is a section in a plane along the face of the insert, so that the metal of the cast ribs in front of the insert does not appear, but the full width of each rib is indicated partly by broken lines back of the insert.)

The casting illustrated in some of the drawings is a die casting, and while this form of casting may be employed, nevertheless it is obvious that the mold may be cast by standard steel or iron foundry practice as desired.

It is desirable in certain instances to adapt existing molds in conformity with my invention. In Fig. 8 I have illustrated a fragment 40 of an existing mold. The mold has the usual rib formations 24 and 26 similar to those heretofore described. The side walls of these ribs have been provided with narrow slots 41 by a sawing, milling or other metal cutting operation. The base wall 22 may be provided with a similar slot 42 if desired. These slots 41 and 42 are parallel walled and of such width, that when the thin parallel walled metal insert 30a is forced into the slots it will be retained therein by the walls of the slot. In other words, the insert has a pressed fit relative to the slots, or it may be tightened in the slots by peening the ribs against the insert.

From the foregoing it will be seen that my improved mold generally comprises a cast base provided with integrally cast ribs of the same cast metal as the base together with a series of thin rolled plate inserts, which extend from one cast rib to another to form very thin kerfs in the tires formed by such mold.

It will be seen from the drawing and description above given that the thin metal inserts are effectively anchored in place in the tire mold as permanently as if they were an integral part thereof; but on the other hand, these inserts may be parallel walled and are much thinner than is practicable to make by an ordinary casting or even a die casting. My method of making the mold, either by casting the metal about the plates or forcing the plates into grooves in the cast ribs, provides a rigid mold structure which forms the narrow transverse kerfs desired at the time of the formation and curing of the tread, and without subsequent operation.

If it is desired to interrupt the straight course of the transverse narrow ribs, without interfering with the narrow character thereof, this may be done by making the insert of a wavy or diverted form in place of being strictly planular. An insert of such character is illustrated at 30, Fig. 6, where adjacent its central region the insert is diverted into an approximately semi-cylindrical loop 38. This offset is intended to illustrate any diversion of the insert without interfering with its parallel opposite faces or its narrow characteristics. The ends may be inclined and notched as at 31, 32, Fig. 6, or they may be straight and normal to the top and bottom edges, as shown in Fig. 8.

It is to be understood that in place of making the mold as a one-piece annular member, it may be made as segments which are combined to make the annular form. Also in place of making the mold as a liner inserted as another casting, it might if desired be a single casting with that portion of the main mold which forms the exterior of the tire on that side.

I claim:

The method of making a tire mold comprising casting a metal base with ribs extending upwardly therefrom, thereafter forming grooves in said ribs, placing in the grooves metal inserts in the form of plates thinner than can be effectively cast, and peening the ribs against the inserts so as to hold them effectively in place.

HENRY C. BOSTWICK.